Figure 1:
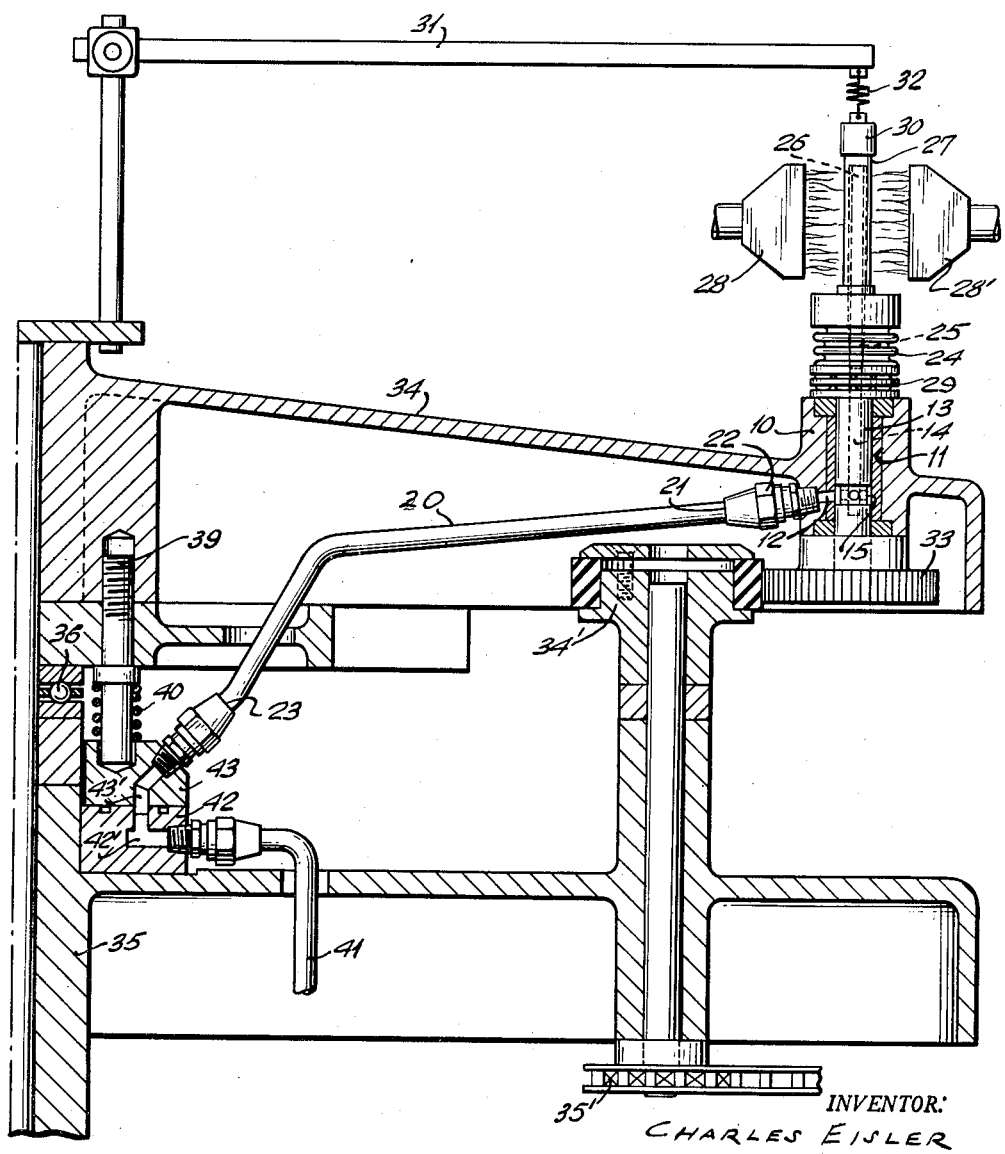

INVENTOR:
CHARLES EISLER
BY
ATTORNEY:

Jan. 29, 1957
C. EISLER
2,779,135
TUBE SHRINKING MACHINE
Filed June 13, 1952
2 Sheets-Sheet 2
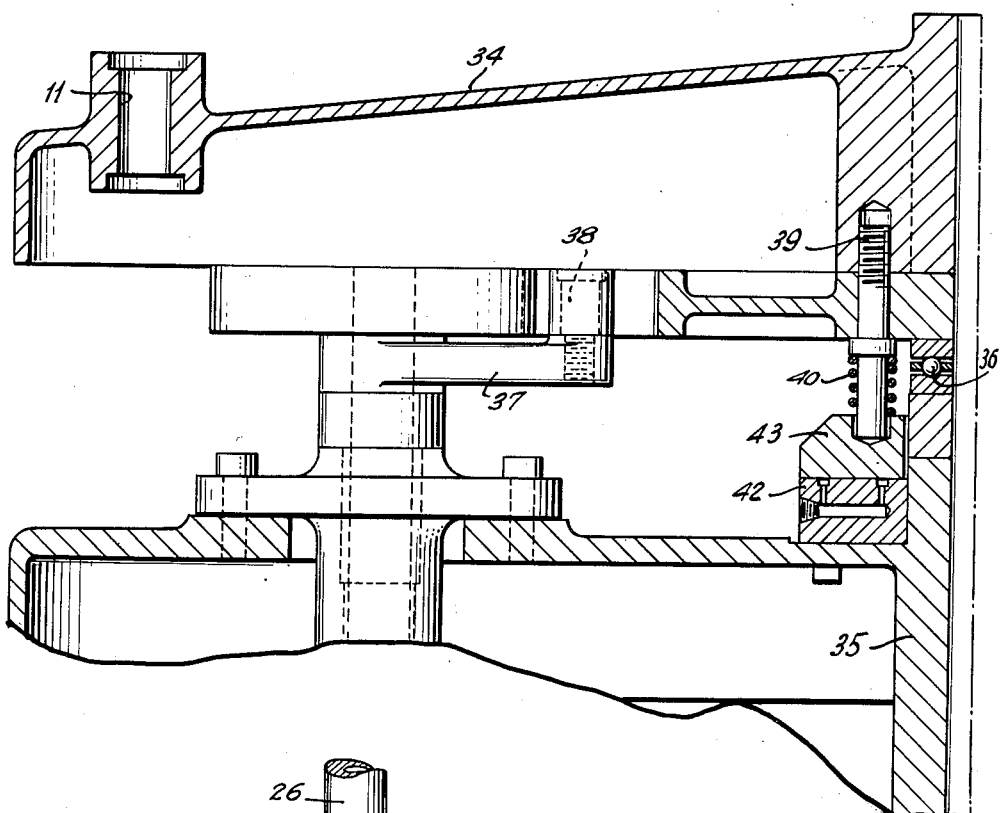
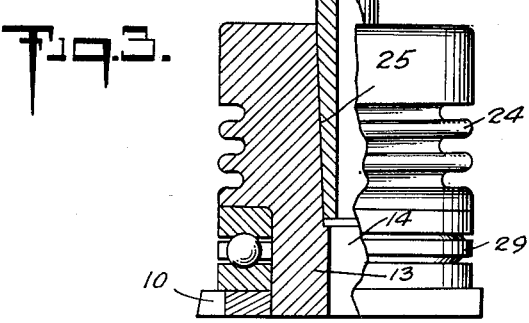
INVENTOR:
CHARLES EISLER
BY
Harry Sommers
ATTORNEY:

United States Patent Office 2,779,135
Patented Jan. 29, 1957

2,779,135

TUBE SHRINKING MACHINE

Charles Eisler, South Orange, N. J.

Application June 13, 1952, Serial No. 293,355

3 Claims. (Cl. 49—7)

This invention relates to the art of manufacturing glass articles, and more particularly to the manufacture of glass tubes such as are used in the manufacture of syringes and for other uses. As is well known in this art, it is extremely difficult to control the diameter of glass tubes in the manufacture thereof.

The present invention is designed to permit the initial manufacture of glass tubes of larger than the desired ultimate internal diameter, and to shrink such tubes down to precisely the desired internal diameter with an apparatus hereinafter more particularly described. The term "tubes" as used herein shall be deemed to mean any tubular glass object.

The accompanying drawings illustrate practical embodiments of the invention; it will be apparent to those skilled in the art that pursuant to the teachings of the present disclosure, many additions and modifications may be made within the spirit and scope of the invention. All of such modifications which utilize the principles of the invention as set forth herein and come within the terms of the appended claims shall be deemed to be within the purview and scope of this invention.

In the drawings:

Fig. 1 is a vertical sectional partly elevational view of an apparatus embodying the invention, shown associated with a machine, the other half of which is shown in Fig. 2, in vertical sectional partly elevational view, and Fig. 3 is a fragmentary vertical sectional view of a tubular housing and associated parts shown in Fig. 1.

The form of apparatus comprising my invention shown in Fig. 1 comprises a tubular housing 10 having a vertical recess 11 and a transverse aperture 12 opening thereinto. A cylinder 13 is rotatably journalled in the housing, said cylinder having a medial axial recess 14 and a radial aperture 15 connected thereto, said cylinder being so disposed in the housing, that the cylinder and housing apertures 15 and 12 will be disposed in the same horizontal plane. In the specific form of the invention shown in Fig. 1, the radial aperture 15 is of wheel-shaped outline so that as the cylinder 13 rotates, one of the spokes or radial portions of the aperture will be in constant communication with the outer rim or recess of the aperture. Thus, as the cylinder 13 rotates, the rim or outermost recess of the aperture 15 will be in constant opening relation with the aperture 12 of the tubular housing 10, providing a constant connection between aperture 12 and the recess 14 in the cylinder 13. An air line 20 is connected at one end 21 to the housing aperture 12 by suitable means such as the coupling 22, the other end 23 thereof being adapted for connection to an exhaust station. The upper end of cylinder 13 is enlarged as shown and constitutes a heat radiating head which may, as shown, have a plurality of radiating fins, and is positioned on the housing 10. This head 24 has an axial aperture or pocket 25 therein in registry with the cylinder recess 14. An axially apertured mandrel 26 is positioned in the aperture 25 and partly projects therefrom, the projecting part of the mandrel constituting the standard. The glass tube 27 to be shrunk to the diameter of the mandrel is positioned thereon and on the head 24. The tube may be subjected to external heating as by means of the burners indicated generally at 28, 28', while being simultaneously internally exhausted through the air line 20. Suitable anti-friction means may be interposed as at 29 in the apparatus, if so desired. Where the tube 27 is open at both ends, the upper end thereof may be closed by means of cap 30 carried by a bracket 31 or the like; suitable spring means 32 may be interposed between the bracket and cap, if so desired.

It will be apparent that by the use of the invention, the glass tube may be heated and continuously exhausted during the rotation operation above described, to shrink the tube to the precise diameter of the mandrel, which is preferably a steel mandrel. The parts are then cooled, the steel mandrel shrinking more rapidly than the glass tube; at a point of the cooling operation, the steel mandrel shrinking more rapidly than the glass tube will permit the glass tube to be readily removed therefrom for shipment or to subject the same to further manufacturing procedures.

Cylinder 13 may be rotated by keying the same to a gear 33 or the like which in turn may be driven from any suitable source or train indicated generally at 34', 35'.

The apparatus of this invention may be secured to the spider 34 or may form part thereof. The spider 34 may be mounted on a fixed bearing 35 of the machine with suitable anti-friction devices 36 interposed, if desired. The drive mechanism for the spider 34 may be of any desired or convenient type, such as, for example, the "Geneva movement" arrangement indicated at 37, 38 of the drawings, which might correspond with that indicated in Patent 2,447,569 issued to me August 24, 1948 (Fig. 8), by the reference characters 28, 27, and in Patent 2,553,135 issued to me May 15, 1951, by the reference characters 14, 15 (Fig. 2), or any other desired or convenient drive means satisfactory for rotating the spider in continuous or station-to-station rotation, to carry out the present invention. The bearing member 43 may be keyed to the spider 34 by any desired or convenient means, as, for example, by pins 39 threaded to the spider and freely received in vertical bores in plate member 43. By the use of interposed springs 40 between the pins and one of said members 34, 43, they may be keyed together in a vertical plane while yieldable in a lateral plane to permit of slight relative movement of said parts in operation, if so desired. Suitable means are provided to connect the air vacuum line 20 when the vacuum station 41 which may, for example, be a vacuum line connected to a vacuum pump, or the like, as, for example, by providing plates 43, secured to the spider 34 as above noted and a plate 42 positioned on the bearing 35 with apertures 42', 43' which will register at a predetermined station or stations of rotation of the spider or for 360° if desired, to connect the fixed vacuum line 41 with the line 20 movable with spider 34.

It will be understood that the heating and exhausting of tube 27 will be predetermined, the stations and actuation of the parts being correspondingly arranged. After heating and exhausting the tube 27 on the mandrel 26, the parts are allowed to cool. The mandrel 26 is preferably a steel mandrel of accurate predetermined outside diameter to conform to the desired internal diameter of tube 27 which, prior to the step shown on the drawings and above described is preferably of slightly greater internal diameter or of irregular internal diameter. As the mandrel 26 is of steel or other material, it will cool and contract more rapidly than the glass tube 27 and will shrink therefrom while so cooling; the tube 27 may be readily lifted therefrom at a stage in the cooling process. It will also be understood that, as shown in my said patents, the spider 34 may have station-to-station rotation, and a plurality of housings 10 and associated parts may be provided for the desired number of stations.

Having thus described my invention, what I claim as new and desire to secure by Letters Patent is:

1. A machine for shrinking lengths of glass tubing to a desired internal diameter, comprising a housing portion provided with a recess generally cylindrical about a vertical axis, said housing portion having a generally radial aperture connected to evacuating means, means for supporting a length of glass tubing open at both ends, said supporting means having an upwardly opening pocket and a lower portion passing through said housing portion and journaled therein, the upper portion of said supporting means being enlarged, providing an upper generally horizontal surface engageable by the lower end of the length of tubing and, heat-dissipating fins on the supporting means beneath the said upper surface thereof, anti-friction means protected from heat by said finned portion and disposed between it and the upper surface of said housing portion to facilitate turning of said supporting means, a mandrel with a bore extending from end to end and with its lower portion fitting the pocket in said supporting means, so that its upper end lies below the upper end of the length of glass tubing to be shrunk, said supporting means having a transverse aperture from its pocket registering with the housing portion aperture for the introduction of vacuum to the bore of said mandrel, means for closing the upper end of a length of glass tubing when placed around said mandrel and while resting on said supporting means, means for heating such length of tubing, and means secured to the lower end of said supporting means for rotating it.

2. In a machine as set forth in claim 1, said mandrel having an outer cylindrical surface and formed of material with a coefficient of expansion greater than that of glass so that, upon cooling, a length of glass tubing shrunk thereon is readily removable.

3. In a machine as set forth in claim 1, said means for rotating said supporting means being a gear, a vertical shaft journaled in the machine frame and carrying another gear meshing with said first-mentioned gear, and driven means secured to the lower end portion of said shaft.

References Cited in the file of this patent

UNITED STATES PATENTS

| | | |
|---|---|---|
| 2,060,658 | Brown et al. | Nov. 10, 1936 |
| 2,349,822 | Gardner | May 30, 1944 |
| 2,368,170 | Smith | Jan. 30, 1945 |
| 2,470,234 | Brewer | May 17, 1949 |
| 2,490,252 | Brewer | Dec. 6, 1949 |
| 2,684,556 | Molinari | July 27, 1954 |